United States Patent
Leglaye et al.

(10) Patent No.: US 10,233,836 B2
(45) Date of Patent: Mar. 19, 2019

(54) TURBOMACHINE COMBUSTION CHAMBER PROVIDED WITH AIR DEFLECTION MEANS FOR REDUCING THE WAKE CREATED BY AN IGNITION PLUG

(71) Applicant: SAFRAN AIRCRAFT ENGINES, Paris (FR)

(72) Inventors: Francois Leglaye, Vaux le Penil (FR); Olivier Bidart, Fontenay Sous Bois (FR); Pierre-Francois Pireyre, Brie-Comte-Robert (FR); Christophe Pieussergues, Nangis (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 249 days.

(21) Appl. No.: 15/026,010

(22) PCT Filed: Oct. 2, 2014

(86) PCT No.: PCT/FR2014/052500
§ 371 (c)(1),
(2) Date: Mar. 30, 2016

(87) PCT Pub. No.: WO2015/049468
PCT Pub. Date: Apr. 9, 2015

(65) Prior Publication Data
US 2016/0237896 A1 Aug. 18, 2016

(30) Foreign Application Priority Data

Oct. 4, 2013 (FR) ...................................... 13 59659

(51) Int. Cl.
*F02C 1/00* (2006.01)
*F02C 7/04* (2006.01)
(Continued)

(52) U.S. Cl.
CPC .................. *F02C 7/04* (2013.01); *F02C 3/04* (2013.01); *F02C 7/18* (2013.01); *F02C 7/264* (2013.01);
(Continued)

(58) Field of Classification Search
CPC .. F23R 3/002; F23R 3/04; F23R 3/045; F23R 3/26; F23R 3/16; F23R 2900/00018; F02C 7/264; F02C 7/266
See application file for complete search history.

(56) References Cited

U.S. PATENT DOCUMENTS 8,505,311 B2    8/2013  Deschamps et al.
9,494,321 B2 *  11/2016 Melton ...................... F23R 3/08
(Continued)

FOREIGN PATENT DOCUMENTS

EP    2 527 739 A2   11/2012
FR    2 975 465 A1   11/2012

OTHER PUBLICATIONS

U.S. Appl. No. 14/564,588, filed Dec. 9, 2014, F. Leglaye et al.
(Continued)

*Primary Examiner* — Gerald L Sung
*Assistant Examiner* — Jacek Lisowski
(74) *Attorney, Agent, or Firm* — Oblon, McClelland, Maier & Neustadt, L.L.P.

(57) ABSTRACT

A device for cooling of an annular wall of a turbomachine combustion chamber provided with micro-perforations, and in particular the cooling of a region of the wall facing a wake induced by an ignition plug, the device includes, a deflector designed to divert air immersing the ignition plug towards a median plane of the wake and towards the annular wall of the combustion chamber, so as to increase the air pressure within the wake in proximity to the annular wall.

12 Claims, 7 Drawing Sheets

(51) Int. Cl.
| | |
|---|---|
| *F23R 3/04* | (2006.01) |
| *F23R 3/06* | (2006.01) |
| *F23R 3/16* | (2006.01) |
| *F02C 7/264* | (2006.01) |
| *F02C 3/04* | (2006.01) |
| *F02C 7/18* | (2006.01) |
| *F02P 15/00* | (2006.01) |

(52) U.S. Cl.
CPC .............. *F02P 15/003* (2013.01); *F23R 3/04* (2013.01); *F23R 3/06* (2013.01); *F23R 3/16* (2013.01); *Y02T 50/675* (2013.01)

(56) References Cited

U.S. PATENT DOCUMENTS

| | | |
|---|---|---|
| 2012/0291442 A1 | 11/2012 | Commaret et al. |
| 2012/0297785 A1 | 11/2012 | Melton et al. |
| 2014/0090385 A1* | 4/2014 | Kodukulla .............. F23R 3/002 60/756 |
| 2014/0223912 A1* | 8/2014 | Rullaud ................... F23R 3/06 60/722 |

OTHER PUBLICATIONS

International Search Report dated Jan. 15, 2015 in PCT/FR2014/052500 filed on Oct. 2, 2014.

French Preliminary Search Report dated Jun. 12, 2014 in French Application No. 1359659 filed on Oct. 4, 2013.

\* cited by examiner

TURBOMACHINE COMBUSTION CHAMBER PROVIDED WITH AIR DEFLECTION MEANS FOR REDUCING THE WAKE CREATED BY AN IGNITION PLUG

TECHNICAL FIELD

The present invention relates to the field of turbomachine combustion chambers, especially intended to equip aircrafts.

The invention more particularly relates to the cooling of an annular wall of such a combustion chamber equipped with a port for an ignition plug.

STATE OF PRIOR ART

Figure 1:
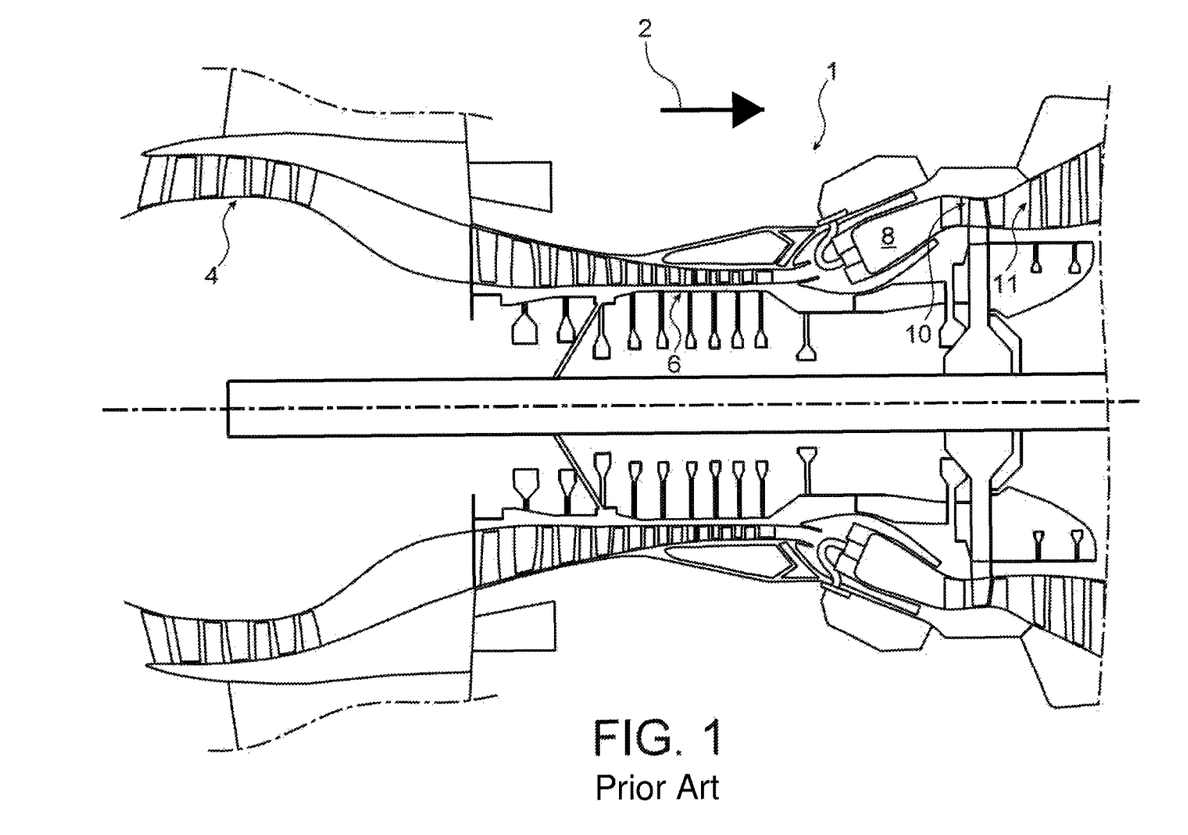
FIG. 1, already described, is an axial cross-section partial schematic view of a known type turbomachine.

FIG. 1 illustrates a typical example of a known type turbomachine 1, for example, an aircraft twin spool turbofan engine.

The turbomachine 1 successively comprises, along the thrust direction represented by the arrow 2 also corresponding to the general direction of gas flow in the turbofan, a low pressure compressor 4, a high pressure compressor 6, an annular combustion chamber 8, a high pressure turbine 10 and a low pressure turbine 11.

In a well-known manner, the combustion chamber 8 is mounted downstream from the high pressure compressor 6 provided for supplying this chamber with pressurized air, and upstream from the high pressure turbine 10 provided for rotating the high pressure compressor 6 under the effect of gas thrust coming from the combustion chamber.

Figure 2:
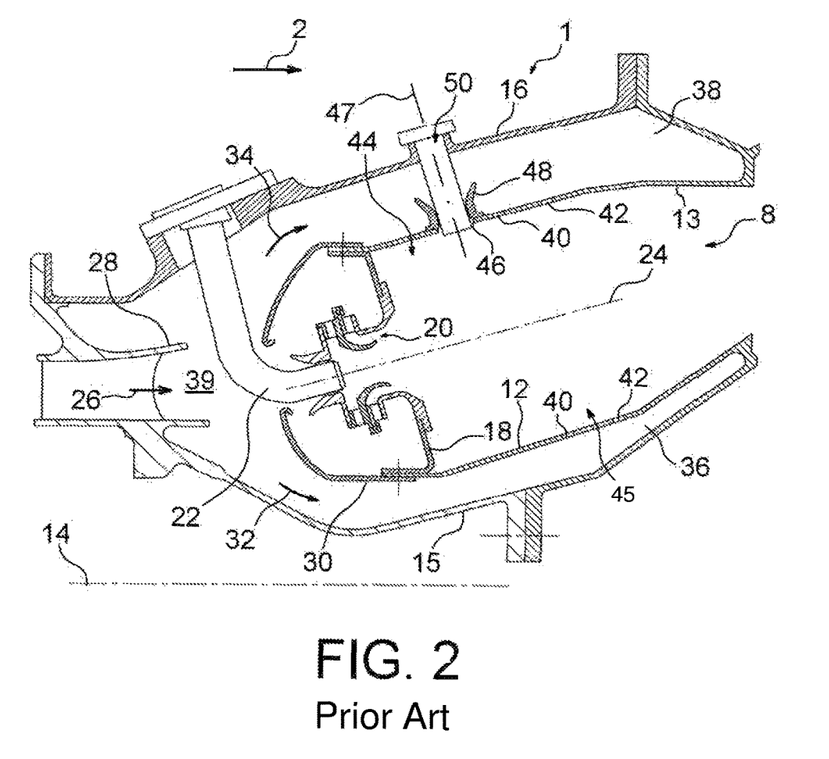
FIG. 2, already described, is an axial cross-section partial schematic half-view of an annular combustion chamber of the turbomachine of FIG. 1.

FIG. 2 illustrates on larger scale the combustion chamber 8 and its close environment.

The combustion chamber 8 comprises two respectively radially inner 12 and radially outer 13 coaxial annular walls, which extend around the longitudinal axis 14 of the combustion chamber.

These two annular walls 12 and 13 are fixed downstream to inner 15 and outer 16 casings of the chamber, and are connected to each other at their upstream end by a chamber annular end wall 18.

The chamber annular end wall 18 includes an annular row of ports evenly distributed around the axis 14 of the combustion chamber, and in which injection systems 20 are mounted, associated with an annular row of fuel injectors 22 each having a fuel emission axis 24.

Each injection system 20 includes ports for injecting, in the combustion chamber, part of the airflow 26 coming from the diffuser 28 mounted at the outlet of the high pressure compressor of the turbomachine.

Besides, the annular walls 12 and 13 of the combustion chamber are connected at their upstream end to an annular shroud 30 including ports aligned with the injection systems 20 for passing fuel injectors 22 and air supplying the injection systems 20. The main functions of this shroud 30 are to protect the chamber end wall 18 and to guide parts 32 and 34 of the airflow 26 which respectively travel downstream along the inner 12 and outer 13 annular walls of the combustion chamber, within two respectively inner 36 and outer 38 bypass spaces. Hereinafter, the parts 32 and 34 of the airflow 26 are respectively referred to as "inner bypass airflow" and "outer bypass airflow". The inner 36 and outer 38 bypass spaces form, with an upstream space 39 which connects one to the other, an annular enclosure in which the combustion chamber 8 extends.

The annular walls 12 and 13 of the combustion chamber each include two annular rows of air inlet ports 40, 42 for injecting part of each bypass airflow 32, 34 in the combustion chamber.

A first one of these rows of ports is formed around an upstream region 44 of the combustion chamber commonly referred to as a "primary area", in which the combustion reactions of the air and fuel mixture occur in operation. For this reason, the ports 40 of this first row are commonly referred to as "primary ports".

The second row of ports is formed downstream around a region 45 of the chamber commonly referred to as a "dilution area" in which the combustion gases are diluted and cooled. For this reason, the ports 42 of this second row are commonly referred to as "dilution ports."

The annular walls 12 and 13 are further provided with numerous micro-perforations substantially distributed on the whole surface of these walls and intended to create a cooling air film along each of these walls within the combustion chamber 8. These micro-perforations, which generally have diameters between 0.3 and 0.6 mm approximately, are not represented in FIG. 2 for reasons of scale.

Besides, the radially outer annular wall 13 includes a plug port 46, having an axis 47, and fitted with a guiding bushing 48 in which an ignition plug 50 extends, mounted on the outer casing 16 and intended to initiate the combustion of the air and fuel mixture at the start of the turbomachine.

It is to be noted that hereinafter, the term "combustion chamber module" refers to an assembly comprising at least the combustion chamber 8 and the ignition plug 50.

Figure 3:
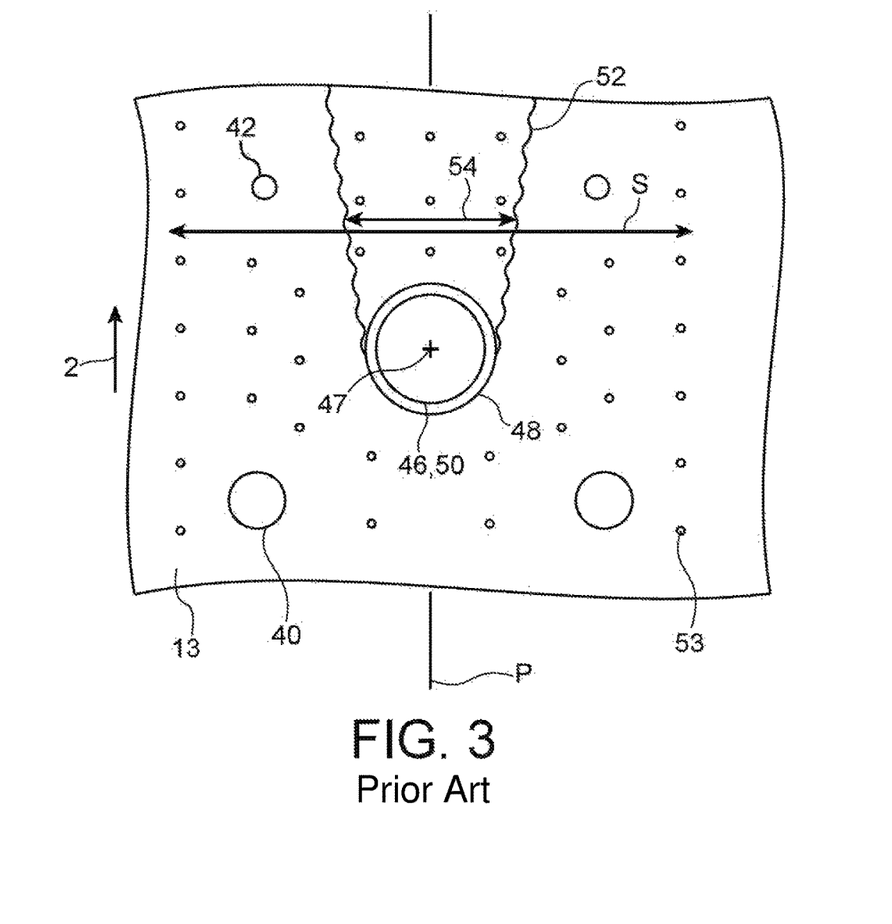
FIG. 3, already described, is a top partial schematic view of a radially outer annular wall of the combustion chamber of FIG. 2.

However, the ignition plug 50 and the bushing 48 produce a wake 52 within the outer bypass airflow 34, as illustrated in FIG. 3.

This wake 52 develops downstream by being centred relative to a median axial plane P of the plug port 46, in the case where the airflow 26 (FIG. 2) supplied by the high pressure compressor flows downstream substantially without a gyratory component. This can be the case when the high pressure compressor is of the axial type, as in the illustrated example.

On the other hand, in the case where the airflow 26 supplied by the high pressure compressor flows downstream helically, that is with a gyratory component, the wake 52 generally develops downstream along a tilted direction relative to the median axial plane P of the plug port 46. This can be the case especially when the high pressure compressor is of the centrifugal type.

It is to be noted that "axial plane" means a plane passing through the axis 14 (FIG. 2) of the combustion chamber 8, which merges with the axis of the turbomachine. It is to be noted that the plane P corresponds to the section plane of FIG. 2.

It is also to be noted that FIG. 3 illustrates the micro-perforations 53 which ensure the cooling of the radially outer annular wall 13. For the sake of clarity, these micro-perforations are represented larger and distributed according to a lesser density than in reality.

In every case, the wake 52 results in a depression in the region of the outer bypass airflow 34 concealed by the plug guiding bushing 48.

Figure 4:
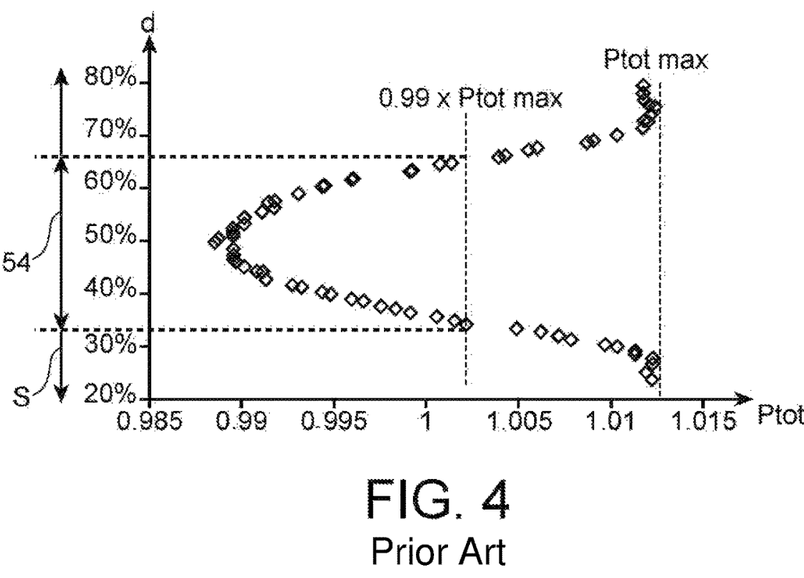
FIG. 4, already described, is a graph representing the total pressure (on the abscissa) as a function of the circumferential position (on the ordinate) along the transverse segment S of FIG. 3.

FIG. 4 represents the total pressure Ptot of this airflow 34 as a function of the position d measured along the transverse segment S of FIG. 3. Hereinafter, for each segment S, a wake area 54 (FIG. 3) is defined as being an area of the segment S in which the total pressure Ptot of the airflow 34 is lower than 99% of the maximum Ptotmax taken by this total pressure along this segment S. A wake 52 is defined as being a gathering of adjoining wake areas 54 succeeding from upstream to downstream from the plug port 46.

But, the presence of such a wake disrupts the efficiency of the cooling ensured by the micro-perforations 53.

Indeed, the flow of air through micro-perforations 53 of the radially outer wall 13 results from the difference between the total pressure Ptot of the bypass airflow 34 and the static pressure within the combustion chamber 8. This pressure difference is generally in the order of 3%. Due to this, the total pressure drop in the order of 1% noticed within the wake 52 induces a loss of flow within micro-perforations that can reach about 20% or even more.

Such a decrease in the efficiency of the cooling of the abovementioned annular wall results in a diminution of the lifetime of this wall, and also in a risk of loosening of the plug guiding bushing.

DISCLOSURE OF THE INVENTION

The purpose of the invention is especially to bring a simple, economical, and efficient solution to this problem.

To do so, it provides a combustion chamber module for a turbomachine, comprising:
  an annular enclosure,
  an annular combustion chamber accommodated in said annular enclosure and including at least one annular wall delimiting said combustion chamber and including a plug port as well as a plurality of micro-perforations to let in cooling air in said combustion chamber for cooling said annular wall, and
  an ignition plug extending in said annular enclosure and through said plug port.

This combustion chamber module is intended to receive an airflow coming from a turbomachine compressor and generally flowing from upstream to downstream of the combustion chamber within said annular enclosure, and a part of which is designed to bypass the combustion chamber by running along said annular wall thereof and by immersing said ignition plug which thus creates a wake.

According to the invention, said combustion chamber module further comprises deflection means extending from upstream to downstream by approaching a median plane of said wake and by approaching said annular wall of the combustion chamber, so as to divert, towards said median plane of said wake and towards said annular wall of the combustion chamber, part of the air immersing said ignition plug.

The thus diverted air enables the total pressure of air to be increased within the wake induced by the ignition plug, in proximity to the annular wall of the combustion chamber, and therefore the pressure difference to be increased between said wake and the inside of the combustion chamber.

As a result, the convective transfer through the micro-perforations of said annular wall is improved, and therefore risks of cracks occurring and risks of metal loss are reduced, and consequently generally speaking, the lifetime of this annular wall is improved.

When the ignition plug is guided through the sidewall of the combustion chamber by means of a bushing mounted in the plug port, the invention also enables the risks of bushing disengagement to be reduced.

"Bushing" means any type of device, possibly in several parts, enabling the plug to be guided through the annular wall of the combustion chamber, as will appear more clearly hereinafter.

In a first preferred embodiment of the invention, said deflection means comprise two ducts each delimited by a first tangential wall arranged facing the annular wall of the combustion chamber, a second tangential wall arranged on the opposite side with respect to the annular wall of the combustion chamber, a first sidewall arranged on the side of the ignition plug, and a second sidewall arranged on the opposite side with respect to the ignition plug.

Moreover, each of said ducts advantageously has at least one air inlet to draw air to be diverted as well as at least one air outlet to diffuse the diverted air towards said median plane of said wake.

Furthermore, said respective second sidewalls of said ducts advantageously form deflecting walls provided on either side of said ignition plug and extending from upstream to downstream by approaching said median plane of said wake.

Finally, said respective tangential walls of said ducts advantageously extend in the downstream direction by approaching the annular wall of the combustion chamber.

Said ducts are advantageously carried by an annular support extending around said ignition plug.

Alternatively, said deflection means can comprise a curved duct extending around a portion of said plug port and having two air inlets formed at two opposite ends of said duct to draw air to be diverted, and at least one air outlet port formed in a median part of a wall delimiting said duct and opening into said wake.

In this case, said duct is preferably fitted in a bushing mounted in said plug port and intended to guide said ignition plug.

In a second preferred embodiment of the invention, said deflection means comprise a deflecting wall connected to a casing surrounding said combustion chamber and delimiting said annular enclosure, said deflecting wall being shaped so that, when seen in cross-section along any plane parallel to said median plane of said wake, said deflection wall extends in the downstream direction by approaching said annular wall of the combustion chamber, and when seen in cross-section along any plane orthogonal to an axis of said ignition plug, said deflecting wall extends in the downstream direction by approaching said median plane of said wake.

Said deflecting wall is preferably inscribed in a virtual rotational cylinder having a tilted axis relative to a plane orthogonal to the axis of said ignition plug.

The invention also relates to a turbomachine, comprising a combustion chamber module of the above-described type, as well as a compressor opening into said annular enclosure of said combustion chamber module.

It is to be noted that when said compressor is designed to deliver an airflow without a gyratory component to said combustion chamber module, said median plane of said wake is then a median axial plane of said plug port.

The invention also relates to a method for designing a combustion chamber module of the above-described type for an aircraft turbomachine comprising a compressor intended to deliver an airflow to said combustion chamber module.

According to the invention, the method comprises determining the wake produced by said ignition plug in said part of the airflow immersing said ignition plug, and then geometrically defining said deflection means so that the latter extend from upstream to downstream by approaching said median plane of said wake and by approaching said annular wall of the combustion chamber.

BRIEF DESCRIPTION OF THE DRAWINGS

The invention will be better understood, and further detail, features and characteristics thereof will appear upon reading the following description made by way of non-limiting example and with reference to the accompanying drawings in which.

Throughout these figures, identical references can refer to identical or analogous elements.

DETAILED DISCLOSURE OF PREFERRED EMBODIMENTS

Figure 5:
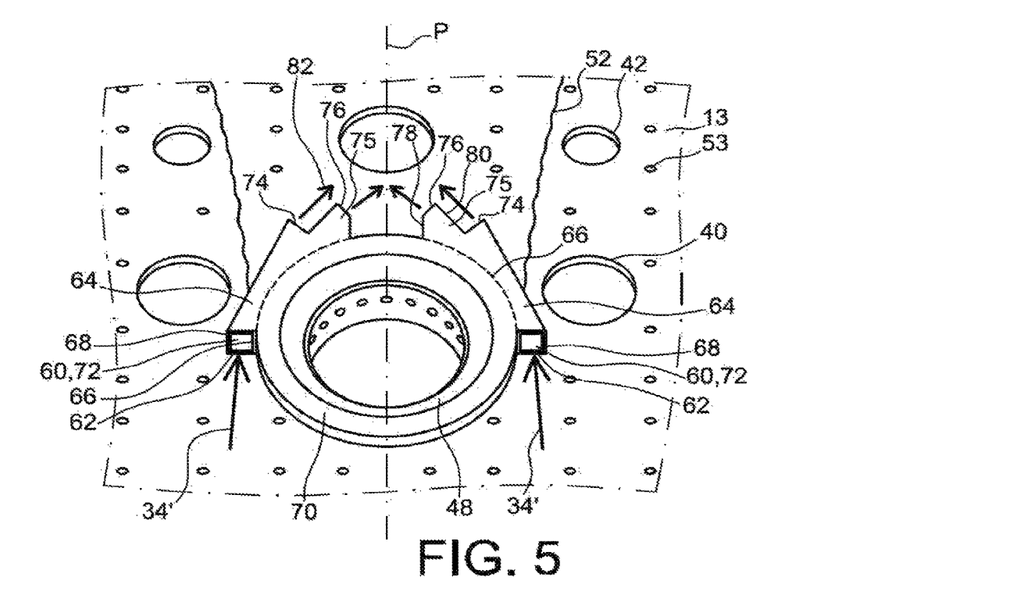
FIGS. 5 and 6 are partial schematic perspective views of a combustion chamber module according to a first preferred embodiment of the invention.
Figure 6:
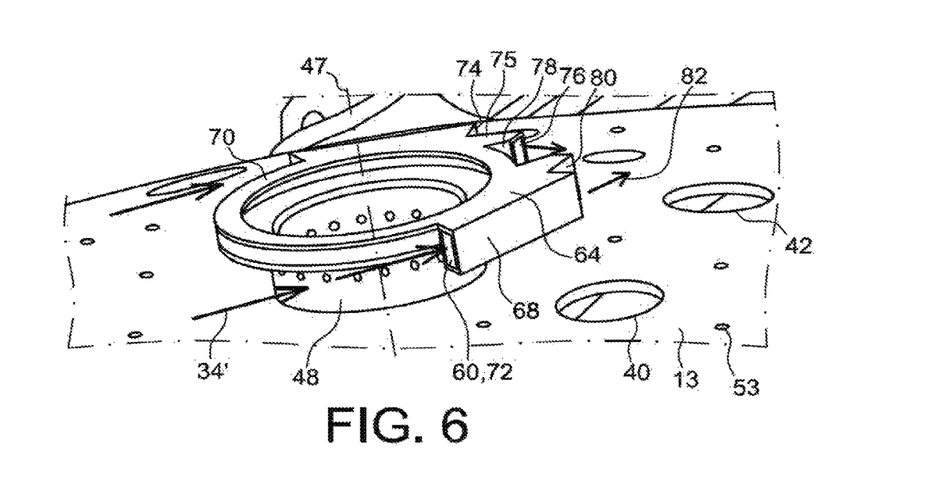

FIGS. 5 and 6 illustrate a combustion chamber module of a turbomachine according to a first embodiment of the invention, and more particularly represent a region of the radially outer annular wall 13 of the combustion chamber, provided with a plug port 46 in which a bushing 48 is mounted.

The combustion chamber module also includes an ignition plug mounted in the bushing 48, but this ignition plug is not represented in FIGS. 5 and 6 for the sake of clarity. The combustion chamber module also includes an annular enclosure delimited by inner and outer casings and in which the combustion chamber is accommodated, similarly to the example of FIG. 2. These elements can also not be seen in FIGS. 5 and 6. These FIGS. 5 and 6 also show primary ports 40 and dilution ports 42, as well as micro-perforations 53, these elements being for example of a conventional type.

In the illustrated example, the turbomachine under consideration includes a compressor designed to deliver an airflow without a gyratory component to the combustion chamber module. Such an airflow thus generally flows along a direction parallel to the axis 14 of the combustion chamber.

In this case, as explained above, the wake 52 induced by the ignition plug and by the associated bushing is substantially centred relative to the median axial plane P of the plug port 46. This latter plane thus forms a median plane of the wake.

According to the invention, the combustion chamber module further includes deflection means to divert a portion 34' of the outer bypass airflow traveling in proximity to the ignition plug towards the median plane P of the wake and of the radially outer annular wall 13 of the combustion chamber, as will appear more clearly hereinafter.

Thus, in the first embodiment illustrated in FIGS. 5 and 6, the deflection means include two ducts 60 each delimited by a first tangential wall 62 arranged facing the annular wall 13 of the combustion chamber, a second tangential wall 64 arranged on the opposite side with respect to the annular wall 13 of the combustion chamber, a first sidewall 66 arranged facing the bushing 48, and a second sidewall 68 arranged on the opposite side with respect to the bushing 48. Both sidewalls 66, 68 are each connected to both tangential walls 62, 64, and the latter are connected to an annular support 70 engaged on the bushing 48 so as to extend around the ignition plug.

The tangential walls 62 and 64 of each duct are shaped so as to extend towards downstream by approaching the annular wall 13 of the combustion chamber, so as to increase the action of the diverted air in the region of the wake 52 located in proximity to the bushing 48.

Each of the ducts 60 has an air inlet 72 facing upstream, as well as a first air outlet 74 facing downstream and towards the median plane P of the wake. In the illustrated example, each duct is continued beyond the first air outlet 74 by a duct extension 75 having a second air outlet 76.

The second sidewall 68 of each of the ducts 60 extends towards downstream by approaching the median plane P of the wake, and thus forms a deflecting wall able to divert the air entering the duct towards said median plane P.

In the illustrated example, the second sidewall 68 of each of the ducts 60 extends parallel to the axis of the ignition plug, which coincides with the axis 47 of the plug port 46. The second sidewall 68 is thus substantially orthogonal to the annular wall 13 of the combustion chamber.

Each duct extension 75 is delimited by an extension of each of the tangential walls 62 and 64, and by a first extension sidewall 78 provided on the side of the median plane P of the wake and a second extension sidewall 80 provided on the opposite side. The latter wall extends towards downstream by approaching the median plane P of the wake, with a higher approaching rate than the one of the corresponding second sidewall 68. This second extension sidewall 80 thus also forms a deflecting wall, according to the terminology of the invention.

Moreover, in the illustrated example, both ducts 60 are symmetrically arranged relative to the median plane P of the wake.

In operation, part of the air supplied to the combustion chamber module by the compressor of the turbomachine travels in the outer bypass space 38 along the radially outer annular wall 13 of the combustion chamber. A portion 34' of the outer bypass airflow, passing in proximity to the ignition plug and the associated bushing 48, enters the ducts 60 and is guided by the second sidewalls 68 and by the second extension sidewalls 80. The ducts 60 thus deliver through their outlets 74 and 76 an airflow 82 diverted towards the median plane P of the wake and the outer annular wall 13 of the combustion chamber. As a result, the total pressure of air is increased in the corresponding area of the wake 52 in proximity to the annular wall 13, enabling the convective exchanges to be improved through the micro-perforations 53, and thus the cooling of the annular wall 13 to be improved.

Figure 7:
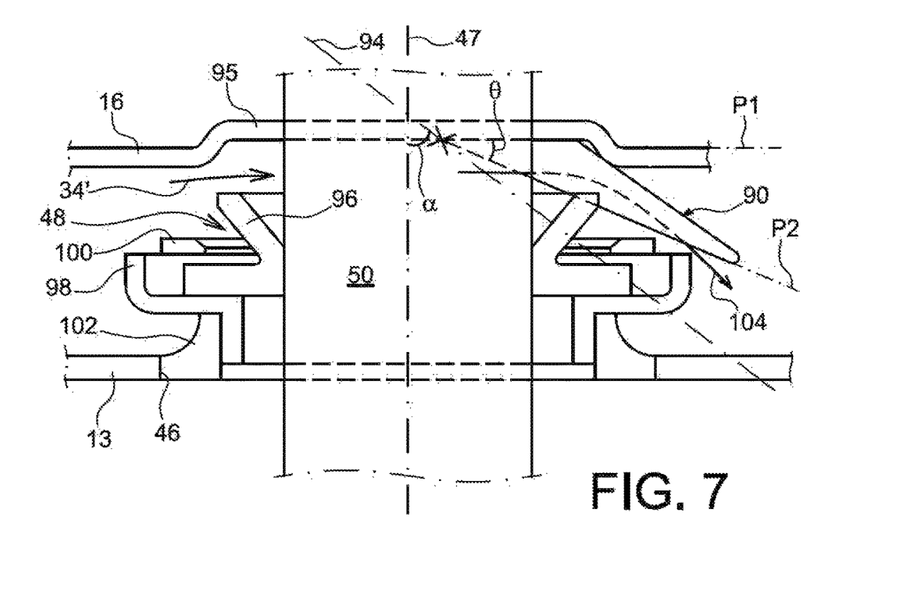
FIG. 7 is an axial cross-section partial schematic view of a combustion chamber module according to a second preferred embodiment of the invention.
Figure 8:
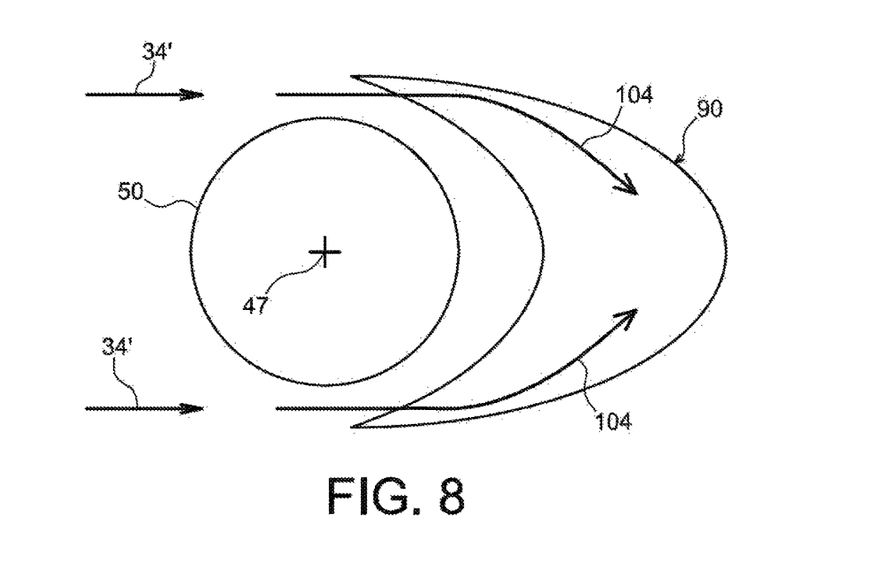
FIG. 8 is a partial schematic view of the combustion chamber module of FIG. 7, in cross-section along a plane P1.
Figure 9:
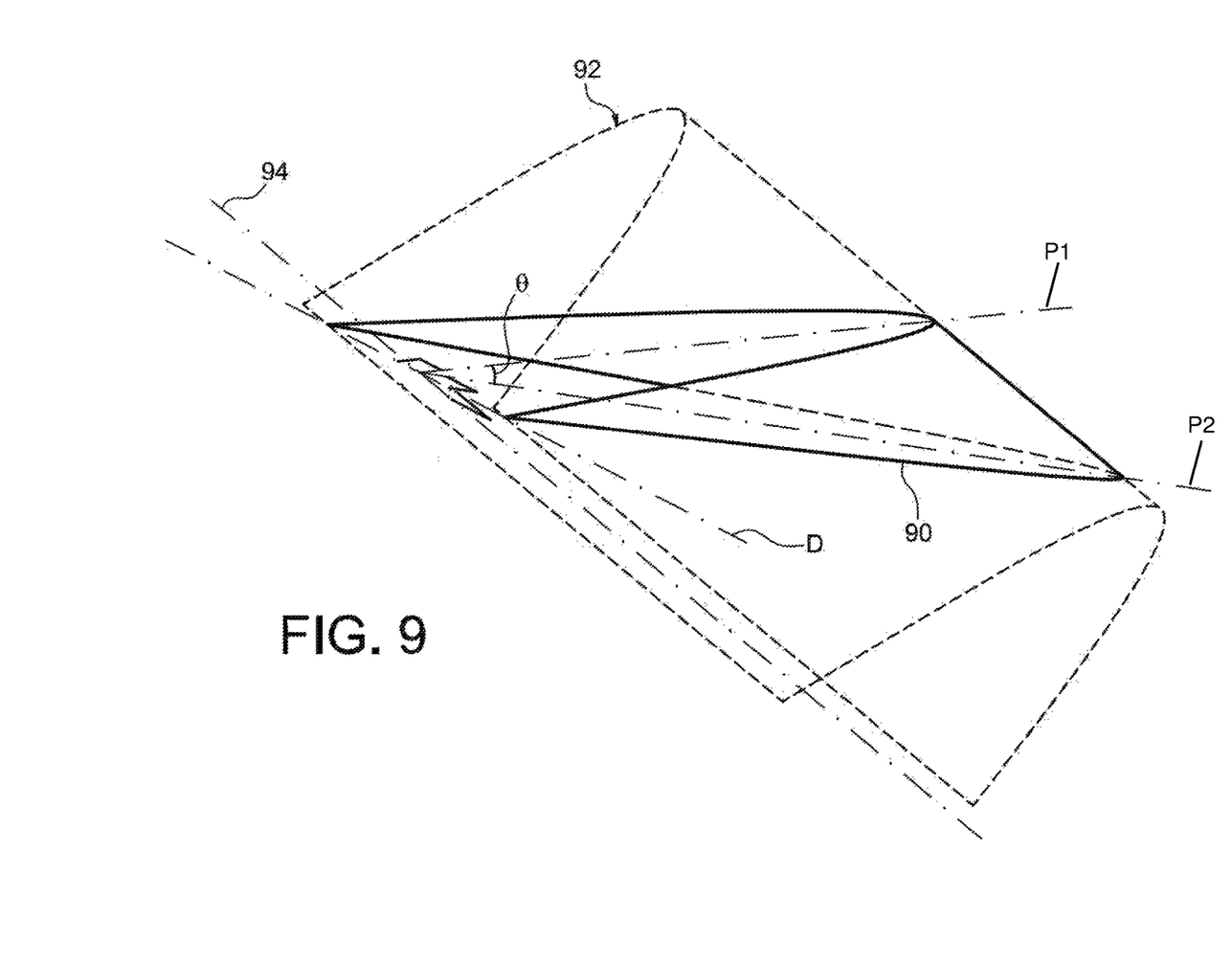
FIG. 9 is a schematic perspective view of a deflecting wall of the combustion chamber module of FIG. 7.

In a second preferred embodiment of the invention illustrated in FIGS. 7 to 9, the deflection means include a deflecting wall 90 connected to the outer casing 16 (FIGS. 7 and 2) surrounding the combustion chamber 8 and delimiting the annular enclosure in which this combustion chamber is accommodated.

This deflecting wall 90 is shaped so that, when seen in cross-section along any plane parallel to the median plane P of the wake, the deflecting wall 90 extends towards downstream by approaching the annular wall 13 of the combustion chamber, and so that, when seen in cross-section along any plane orthogonal to the axis of the ignition plug which coincides with the axis 47 of the plug port 46, the deflecting wall 90 extends towards downstream by approaching the median plane P of the wake.

For this purpose, in the illustrated example, the deflecting wall 90 is inscribed in a virtual cylinder of revolution 92, as illustrated in FIG. 9. More precisely, the deflecting wall 90 corresponds to a section of the cylinder 92 delimited by two planes P1 and P2 which intersect along a line D orthogonal to the axis 94 of the cylinder 92. The plane P1 delimits an upper rim of the deflecting wall 90, through which the latter is connected to the outer casing 16. The plane P1 is thus tangent to this casing 16, and is for example orthogonal to the axis 47 of the plug port 46. The plane P2 delimits a lower rim of the deflecting wall 90. Both planes P1 and P2 have an angle θ therebetween, for example equal to about 30 degrees. Moreover, the axis 94 of the virtual cylinder 92 is for example at an angle α equal to about 45 degrees with the axis 47 of the plug port 46. The axis 94 of the cylinder is thus tilted relative to the plane P1.

By way of example, as shown in FIG. 7, the outer casing 16 includes a boss 95 provided with a port through which the ignition plug 50 extends. The deflecting wall 90 is then advantageously fixed on this boss 95.

FIG. 7 also shows a more detailed example bushing 48 intended to guide the ignition plug 50. This bushing 48 includes a plug guide 96 mounted on a chimney 98 and retained on the latter by an annular piece 100 sometimes referred to as a "cup", as well as a ring 102 crimped in the plug port 46 and in which the chimney 98 is crimped. In a manner known per se, the plug guide 96 thus has a freedom of movement perpendicularly to the axis 47 of the plug port 46, which enables the bushing 48 to support the deformations of the combustion chamber module induced by the usual phenomena of differential expansions.

In operation, as illustrated in FIGS. 7 and 8, part of the air supplied to the combustion chamber module by the compressor of the turbomachine travels in the outer bypass space 38 along the radially outer annular wall 13 of the combustion chamber. A portion 34' of the outer bypass airflow, passing in proximity to the ignition plug, travels towards the deflecting wall 90 and is diverted by the latter so as to constitute an airflow 104 diverted towards the median plane P of the wake and towards the annular wall 13 of the combustion chamber.

As a result, the total pressure of air is again increased in the area corresponding to the wake, enabling the convective exchanges to be improved through micro-perforations of the annular wall 13.

In the illustrated example, the deflecting wall 90 further makes it possible to conceal a region of the outer casing 16 located downstream of the boss 95 of the latter, and thus makes it possible to reduce the level of heat transfer by convection between air and the outer casing 16 at this area. As a result, the heat constraints applied to this particularly exposed area of the outer casing 16 are reduced, and therefore the lifetime of this casing is improved.

Generally speaking, the invention thus makes it possible to improve the lifetime of the annular wall 13 of the combustion chamber in the region of the wake 52 and to reduce the risks of loosening of elements forming the bushing 48 intended to guide the ignition plug through the annular wall 13.

The invention can further make it possible to improve the lifetime of the outer casing 16 when the latter has a boss 95 such as above-described.

In the examples above-described with reference to the accompanying figures, the compressor of the turbomachine is of the type delivering an airflow 26 without a gyratory component, so that the median plane P of the wake is a plane passing through the axis 14 of the combustion chamber.

Of course, the invention also applies to turbomachines including a compressor which is designed to deliver an airflow according to a gyratory movement. In this case, the median plane P of the wake is tilted relative to the axis 14 of the combustion chamber, and the orientation of the deflecting means according to the invention can be adapted accordingly.

The invention claimed is:

1. A combustion chamber module for a turbomachine, comprising:
    an annular enclosure,
    an annular combustion chamber accommodated in said annular enclosure and including at least one annular wall delimiting said annular combustion chamber and including a plug port as well as a plurality of micro-perforations to let in cooling air in said annular combustion chamber for cooling said at least one annular wall, and
    an ignition plug extending in said annular enclosure and through said plug port,
    said combustion chamber module configured to receive an airflow coming from a turbomachine compressor and generally flowing from upstream to downstream of the annular combustion chamber within said annular enclosure, and a portion of the airflow which is designed to bypass the annular combustion chamber by running along said at least one annular wall thereof and by immersing said ignition plug which thus creates a wake,
    wherein said combustion chamber module further comprises deflection means extending from upstream to downstream by approaching a median plane of said wake, so as to divert, towards said median plane of said wake, the portion of the airflow immersing said ignition plug, and
    wherein said deflection means comprise two ducts each delimited by a first tangential wall arranged facing the at least one annular wall of the annular combustion chamber, a second tangential wall arranged on an opposite side with respect to the at least one annular wall of the annular combustion chamber, a first sidewall arranged on a side of the ignition plug, and a second sidewall arranged on an opposite side with respect to the ignition plug;
    wherein each of said two ducts has at least one air inlet to draw air to be diverted as well as at least one air outlet to diffuse the diverted air towards said median plane of said wake;
    wherein said respective second sidewalls of said two ducts form deflecting walls provided on either side of said ignition plug and extending from upstream to downstream by approaching said median plane of said wake; and
    wherein said respective tangential walls of said ducts extend in the downstream direction by approaching the annular wall of the annular combustion chamber.

2. The combustion chamber module according to claim 1, wherein said two ducts are carried by an annular support extending around said ignition plug.

3. A turbomachine, comprising the combustion chamber module according to claim 1, as well as a compressor opening into said annular enclosure of said combustion chamber module.

4. A method for designing and manufacturing the combustion chamber module according to claim 1 for an aircraft turbomachine comprising a compressor intended to deliver an airflow to said combustion chamber module, the method comprising:
   determining the wake produced by said ignition plug in said portion of the airflow immersing said ignition plug;
   defining a geometry of said deflection means so that the deflection means extend from upstream to downstream by approaching said median plane of said wake and by approaching said annular wall of the annular combustion chamber; and
   manufacturing the combustion chamber module.

5. A combustion chamber module for a turbomachine, comprising:
   an annular enclosure,
   an annular combustion chamber accommodated in said annular enclosure and including at least one annular wall delimiting said annular combustion chamber and including a plug port as well as a plurality of micro-perforations to let in cooling air in said annular combustion chamber for cooling said annular wall, and
   an ignition plug extending in said annular enclosure and through said plug port,
   said combustion chamber module configured to receive an airflow coming from a turbomachine compressor and generally flowing from upstream to downstream of the annular combustion chamber within said annular enclosure, and a portion of the airflow which is designed to bypass the annular combustion chamber by running along said at least one annular annular wall thereof and by immersing said ignition plug which thus creates a wake,
   wherein said annular combustion chamber module further comprises deflection means extending from upstream to downstream by approaching a median plane of said wake, so as to divert, towards said median plane of said wake, the portion of the airflow immersing said ignition plug, and
   wherein said deflection means comprise a curved duct extending around a portion of said plug port and having an air inlet to draw air to be diverted, and at least one air outlet formed in a median part of a wall delimiting said curved duct and opening into said wake.

6. The combustion chamber module according to claim 5, wherein said curved duct is fitted in a bushing mounted in said plug port and intended to guide said ignition plug.

7. A turbomachine, comprising the combustion chamber module according to claim 5, as well as a compressor opening into said annular enclosure of said combustion chamber module.

8. A method for designing and manufacturing the combustion chamber module according to claim 5 for an aircraft turbomachine comprising a compressor intended to deliver an airflow to said combustion chamber module, the method comprising:
   determining the wake produced by said ignition plug in said portion of the airflow immersing said ignition plug;
   defining a geometry of said deflection means so that the deflection means extend from upstream to downstream by approaching said median plane of said wake and by approaching said annular wall of the annular combustion chamber; and
   manufacturing the combustion chamber module.

9. A combustion chamber module for a turbomachine, comprising:
   an annular enclosure,
   an annular combustion chamber accommodated in said annular enclosure and including at least one annular wall delimiting said annular combustion chamber and including a plug port as well as a plurality of micro-perforations to let in cooling air in said annular combustion chamber for cooling said at least one annular wall, and
   an ignition plug extending in said annular enclosure and through said plug port,
   said combustion chamber module configured to receive an airflow coming from a turbomachine compressor and generally flowing from upstream to downstream of the annular combustion chamber within said annular enclosure, and a portion of the airflow which is designed to bypass the annular combustion chamber by running along said at least one annular wall thereof and by immersing said ignition plug which thus creates a wake,
   wherein said combustion chamber module further comprises deflection means extending from upstream to downstream by approaching a median plane of said wake and by approaching said annular wall of the annular combustion chamber, so as to divert, towards said median plane of said wake, the portion of the airflow immersing said ignition plug,
   wherein the combustion chamber module further comprises a casing surrounding said annular combustion chamber and delimiting said annular enclosure, said deflection means comprising a deflecting wall connected to said casing, said deflecting wall being shaped so that, when seen in cross-section along any plane parallel to said median plane of said wake, said deflecting wall extends in the downstream direction by approaching said annular wall of the annular combustion chamber, and when seen in cross-section along any plane orthogonal to an axis of said ignition plug, said deflecting wall extends in the downstream direction by approaching said median plane of said wake.

10. The combustion chamber module according to claim 9, wherein said deflecting wall is inscribed in a virtual cylinder of revolution having an axis inclined relative to a plane orthogonal to the axis of said ignition plug.

11. A turbomachine, comprising the combustion chamber module according to claim 9, as well as a compressor opening into said annular enclosure of said combustion chamber module.

12. A method for designing and manufacturing the combustion chamber module according to claim 9 for an aircraft turbomachine comprising a compressor intended to deliver an airflow to said combustion chamber module, the method comprising:
   determining the wake produced by said ignition plug in said portion of the airflow immersing said ignition plug;
   defining a geometry of said deflection means so that the deflection means extend from upstream to downstream by approaching said median plane of said wake and by approaching said annular wall of the annular combustion chamber; and manufacturing the combustion chamber module.

\* \* \* \* \*

UNITED STATES PATENT AND TRADEMARK OFFICE
CERTIFICATE OF CORRECTION

PATENT NO. : 10,233,836 B2
APPLICATION NO. : 15/026010
DATED : March 19, 2019
INVENTOR(S) : Francois Leglaye et al.

Page 1 of 1

It is certified that error appears in the above-identified patent and that said Letters Patent is hereby corrected as shown below:

In the Claims

Column 9, Line 37, Claim 5: change "one annular annular wall" to --one annular wall--.

Signed and Sealed this
Twenty-first Day of April, 2020

Andrei Iancu
*Director of the United States Patent and Trademark Office*